(12) United States Patent
Hannewald

(10) Patent No.: US 7,416,691 B2
(45) Date of Patent: Aug. 26, 2008

(54) METHOD FOR CLOSING OFF A THROTTLE VALVE ASSEMBLY

(75) Inventor: Thomas Hannewald, Griesheim (DE)

(73) Assignee: Siemens Aktiengesellschaft, Munich (DE)

( * ) Notice: Subject to any disclaimer, the term of this patent is extended or adjusted under 35 U.S.C. 154(b) by 452 days.

(21) Appl. No.: 11/062,638

(22) Filed: Feb. 23, 2005

(65) Prior Publication Data
US 2005/0145816 A1 Jul. 7, 2005

Related U.S. Application Data

(63) Continuation of application No. PCT/DE03/02665, filed on Aug. 7, 2003.

(30) Foreign Application Priority Data
Mar. 9, 2002 (DE) .................. 102 40 624

(51) Int. Cl.
B29C 45/14 (2006.01)
(52) U.S. Cl. ................. 264/263; 264/273; 264/274; 264/275
(58) Field of Classification Search ............. None
See application file for complete search history.

(56) References Cited

U.S. PATENT DOCUMENTS

| | | | |
|---|---|---|---|
| 2,385,510 A | | 9/1945 | Harwood |
| 2,607,957 A | * | 8/1952 | Elmer et al. ............ 264/274 |
| 3,078,070 A | | 2/1963 | Cooper |
| 3,291,443 A | | 12/1966 | Schulz et al. |
| 3,528,385 A | | 9/1970 | Rohrer |
| 3,549,123 A | | 12/1970 | Bell et al. |
| 3,753,549 A | | 8/1973 | Rubright |
| 3,902,697 A | | 9/1975 | Robinson |
| 4,103,866 A | | 8/1978 | Robinson |

(Continued)

FOREIGN PATENT DOCUMENTS

AU 447 291 8/1973

(Continued)

OTHER PUBLICATIONS

Derwent Abstract—EP 0 716 222 A1; Jun. 12, 1996; Firma J. Eberspaecher, D-73730 Esslingen, Germany.

(Continued)

*Primary Examiner*—Edmund H. Lee
(74) *Attorney, Agent, or Firm*—Bell, Boyd & Lloyd LLP

(57) ABSTRACT

According to the method, in a first step, an elastic shim element, of a part circular embodiment with a projection on the external side, is fixed around a throttle valve shaft. In a second step, a first insert and a second insert are introduced into the throttle valve support from both sides until each is in contact with the projection and between both and the relevant projection a cavity, surrounding the throttle valve shaft is formed. In a third step, a molten plastic is then introduced into the cavity through the first insert or the second insert, whereby the at least one elastic shim element is pressed with the projection thereof on the inner wall of the throttle valve support. After the plastic has hardened the first insert and the second insert are removed from the throttle valve support in a fourth step.

12 Claims, 2 Drawing Sheets

U.S. PATENT DOCUMENTS

| | | | |
|---|---|---|---|
| 4,259,935 | A | 4/1981 | Watanabe et al. |
| 4,290,615 | A | 9/1981 | Etcheverry |
| 4,344,396 | A | 8/1982 | Yamada |
| 4,358,086 | A | 11/1982 | Hiltebrand |
| 4,363,309 | A | 12/1982 | Ludwig |
| 4,572,478 | A | 2/1986 | Vogler et al. |
| 4,632,360 | A | 12/1986 | DeSalve |
| 4,648,418 | A | 3/1987 | Scobie et al. |
| 4,674,528 | A | 6/1987 | Nishio et al. |
| 4,899,984 | A | 2/1990 | Strickler et al. |
| 5,081,972 | A | 1/1992 | Daly et al. |
| 5,181,492 | A | 1/1993 | Sausner et al. |
| 5,326,077 | A | 7/1994 | Spencer et al. |
| 5,630,571 | A | 5/1997 | Kipp et al. |
| 6,135,418 | A | 10/2000 | Hatton |
| 6,149,130 | A | 11/2000 | Thurston et al. |
| 6,439,255 | B1 | 8/2002 | Chamberlain |
| 7,143,996 | B2 * | 12/2006 | Kohlen et al. ............... 251/305 |

FOREIGN PATENT DOCUMENTS

| | | |
|---|---|---|
| CN | 2237761 Y | 10/1996 |
| DE | 2445106 | 4/1975 |
| DE | 4323078 | 1/1995 |
| DE | 195 12 874 | 10/1996 |
| DE | 19848440 | 4/2000 |
| DE | 10050393 | 4/2002 |
| DE | 10104747 | 8/2002 |
| EP | 0 716 222 A1 | 6/1996 |
| EP | 1035312 A2 | 9/2000 |
| GB | 936 472 | 9/1963 |
| GB | 1 061 651 | 3/1967 |
| JP | 8-506878 | 7/1996 |
| JP | 10252507 A | 9/1998 |
| JP | 11101137 | 4/1999 |
| WO | WO 95/16854 | 6/1995 |

OTHER PUBLICATIONS

Derwent Abstract—DE 195 12 874 A1; Oct. 10, 1996; VDO Adolf Schindling AG, D-60323 Frankfurt, Germany.

Abstract-DE-2445106; Apr. 3, 1974; Milwaukee Alve Co., Inc. USA-Milwaukee, Wis. (USA).

Derwent Abstract-DE19848440; Apr. 27, 2000; Filterwerk Mann+Hummel GmbH, D-71638 Ludwigsburg (Germany).

Derwent Abstract-DE-10104747; Aug. 8, 2002; Siemens AG; D-80333 München (Germany).

Derwent Abstract-DE-4323078; Jan. 12, 1995; Pierburg GmbH, D-41460 Neuss (Germany).

Derwent Abstract-10050393; Apr. 18, 2002; Siemens AG D-80333 München (Germany).

* cited by examiner

METHOD FOR CLOSING OFF A THROTTLE VALVE ASSEMBLY

CROSS REFERENCE TO RELATED APPLICATIONS

The present application is a continuation of international application PCT/DE2003/02665, filed on Aug. 7, 2003, which designated the United States and was pending at the time of designation; and further claims priority to German patent application 10240624.3, filed Sep. 3,2002; the both of which are herein incorporated by reference.

BACKGROUND OF THE INVENTION

Methods for closing off throttle valve assemblies are known. Closing off in this case takes place by means of throttle valves which are arranged centrally in the throttle valve assembly on a throttle shaft. For as low an idling rotational speed as possible, the throttle valve must in this case be capable of closing in a highly leaktight manner, so that adverse leakage air is avoided. As regards the present-day mechanically or electrically driven throttle valve assemblies, attempts are made to achieve this by means of very narrow tolerances of the individual components. This requires a relatively high outlay in manufacturing terms for the throttle valve assembly and for the throttle valve which has to be lathe-turned with the highest possible precision to these narrow tolerances. At the same time, care must be taken to ensure that the throttle valve bears with as high a leaktightness as possible against the inner wall of the throttle valve assembly, but does not touch the inner wall too firmly, since a jamming of the throttle valve may otherwise occur.

SUMMARY OF THE INVENTION

The object on which the invention is based is, therefore, to provide a method for closing off a throttle valve assembly, in which a complicated remachining of the throttle valve assembly or of the throttle valve may be dispensed with.

The object on which the invention is based is achieved by means of a method for closing off a throttle valve assembly, in which, in a first step, at least one elastic compensation element, which is of part-circular design and has a projection on its outside, is fixed around a throttle valve shaft, in a second step a first die and a second die are introduced into the throttle valve assembly from both sides, until they bear in each case against the projection and between the two of them and the respective projection form a cavity surrounding the throttle valve shaft, subsequently, in a third step, a melted-down plastic is introduced into the cavity through the first die or the second die, the at least one elastic compensation element being pressed with its projection against the inner wall of the throttle valve assembly, and, in a fourth step, the first die and the second die being removed from the throttle valve assembly after the curing of the plastic. The projection is, as a rule, formed on both sides, so that the at least one elastic compensation element has a T-shaped cross section in the region of the inner wall of the throttle valve assembly. In the limit case, however, it is also possible that the thickness of the projection approaches 0, that is to say the term "projection" then means only the edge of the at least one elastic compensation element. In this case, the at least one elastic compensation element has a rectangular cross section. In the first step, it is fixed around a throttle valve shaft, and this may take place, for example, by it being pressed against the throttle valve shaft. As at least one elastic compensation element, for example, two elastic compensation elements may be used, which in each case bear with their ends against the throttle valve shaft. The at least one elastic compensation element is dimensioned such that, after it is fixed around the throttle valve shaft, a gap of, for example, 0.1 to 0.5 mm remains. In the second step, a first die and a second die are introduced into the throttle valve assembly from both sides until they bear in each case against the projection. An axial sealing off via the at least one elastic compensation element takes place at the same time. The cavity formed is in the shape of the throttle valve to be arranged, and at the same time the desired angle of incidence of the throttle valve to be produced is predetermined by the shape of the cavity. In the third step, a melted-down plastic is introduced into the cavity through the first die or the second die.

The first die or the second die is a cylindrical solid body which consists, as a rule, of steel. The melted-down plastic can in this case be introduced into the cavity either through the first die or through the second die or through the first die and the second die. Any venting which may be necessary then takes place likewise via the first die or the second die. By the melted-down plastic being introduced, the at least one elastic compensation element is pressed against the inner wall of the throttle valve assembly. It was shown, surprisingly, that, according to this method, a closing off of the throttle valve assembly can take place in such a way that no formation of leakage air occurs when the idling rotational speed is set. In this case, it is advantageous that the setting of low tolerance ranges of the throttle valve and of the throttle valve assembly may be dispensed with. The throttle valve therefore does not have to be lathe-turned with the highest possible precision, and the throttle valve assembly likewise does not have to be remachined in a complicated way on its inner wall.

In a preferred embodiment of the invention, the first step is carried out simultaneously with the second step. This makes it easier to fix the at least one elastic compensation element and shortens the time required for carrying out the method.

According to a further preferred embodiment of the invention, at least one elastic compensation element is used which has bores arranged next to one another on the part circle. The melted-down plastic can penetrate into these bores, so that the connection between the cured plastic and the at least one elastic compensation element, which constitutes the actual throttle valve, can be formed in a particularly stable way.

According to a further preferred embodiment of the invention, there is provision for the at least one elastic compensation element or the melted-down plastic to consist of polyamide-6. Polyamide-6 is particularly resistant, precisely under the conditions, such as are to be noted in throttle valve assemblies during operation.

In a further preferred embodiment of the invention, the melted-down plastic used is a polyphenylenesulfide. Polyphenylenesulfide is particularly suitable for the formation of the throttle valve and can be cured in a particularly advantageous way.

According to a further preferred embodiment of the invention, the cavity formed forms groove-shaped indentations on its side facing away from the throttle valve shaft. In the third step, these groove-shaped indentations are filled up with the melted-down plastic, thus leading directly to the formation of reinforcing ribs during the curing of the plastic, so that the throttle valve consisting of the plastic and of the at least one elastic compensation element has particularly high stability.

According to a further preferred embodiment of the invention, the elastic compensation element is produced as one part and has two opposite perforations and, in the first step, is pushed with the two opposite perforations onto the throttle valve shaft. The positioning of the at least one elastic compensation element is thereby advantageously simplified. The two opposite perforations may in this case be configured such that they project in each case into the bearing bores for the throttle valve shaft. Sealing off against air with respect to the shaft perforation is thereby advantageously achieved. The inside diameter of the opposite perforations thus corresponds approximately to the outside diameter of the throttle valve shaft, in which case, of course, it is necessary to ensure that the elastic compensation element can still be pushed onto the throttle valve shaft.

BRIEF DESCRIPTION OF THE SEVERAL VIEWS OF THE DRAWINGS

The invention is explained in more detail below, by way of example, with reference to the drawing (FIG. 1 to FIG. 3).

DETAILED DESCRIPTION OF THE INVENTION

Figure 1:
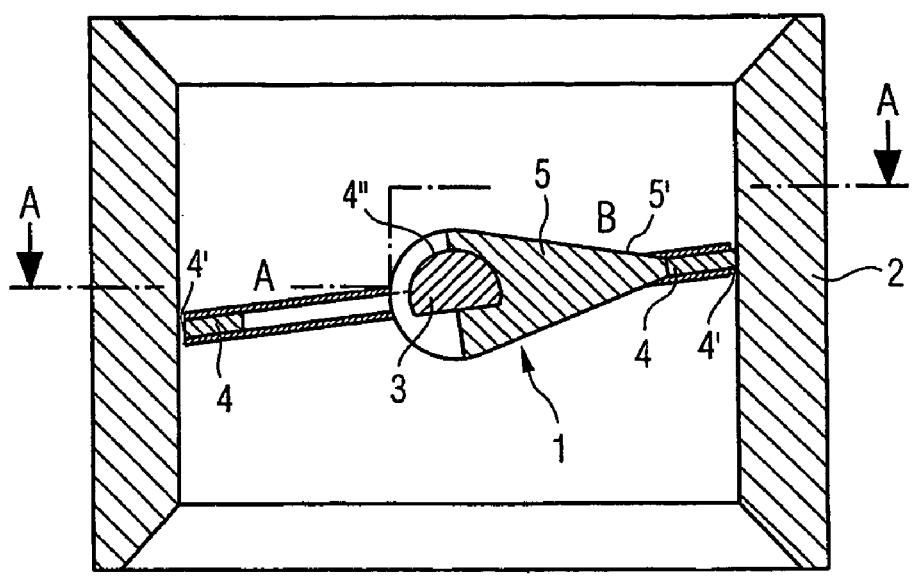
FIG. 1 shows a throttle valve assembly in cross section with the elastic compensation element and with the throttle valve shaft.

The throttle valve assembly 2 is illustrated in cross section in FIG. 1. The half illustration A in this case shows the state in which the elastic compensation element 4 still has some clearance with respect to the throttle valve assembly 2. Said compensation element is provided with a projection 4' and with the latter forms a T-shaped cross section. In the half illustration B, the elastic compensation element 4 bears with its projection 4' directly against the inner wall of the throttle valve assembly 2. In the method for closing off the throttle valve assembly 2, in a first step, at least one elastic compensation element 4, which is of part-circular design and has a projection 41 on its outside, is fixed around a throttle valve shaft 3. This may take place, for example, in that an elastic compensation element is used which can in this case be pressed against the throttle valve shaft 3. In a second step, a first die and a second die (not illustrated) are introduced into the throttle valve assembly 2 from both sides, until they bear in each case against the projection 4'. A cavity surrounding the throttle valve shaft is thereby formed between the two of them and the respective projection 4'. This cavity is in this case configured such that it corresponds to the shape of the throttle valve 1 to be produced. In the third step, a melted-down plastic is introduced into this cavity either through the first die or through the second die or through both dies (not illustrated in each case), at the same time the at least one elastic compensation element 4 being pressed with its projection 41 against the inner wall of the throttle valve assembly 2, as is illustrated in the half illustration B. The curing of the plastic in this case leads directly to the formation of the throttle valve 1 which consists of the cured plastic and of the elastic compensation element 4. The at least one elastic compensation element 4 may be produced as one part and have two opposite perforations 4". In the first step, this one-part elastic compensation element is pushed with the two opposite perforations 4" onto the throttle valve shaft 3.

Figure 2:
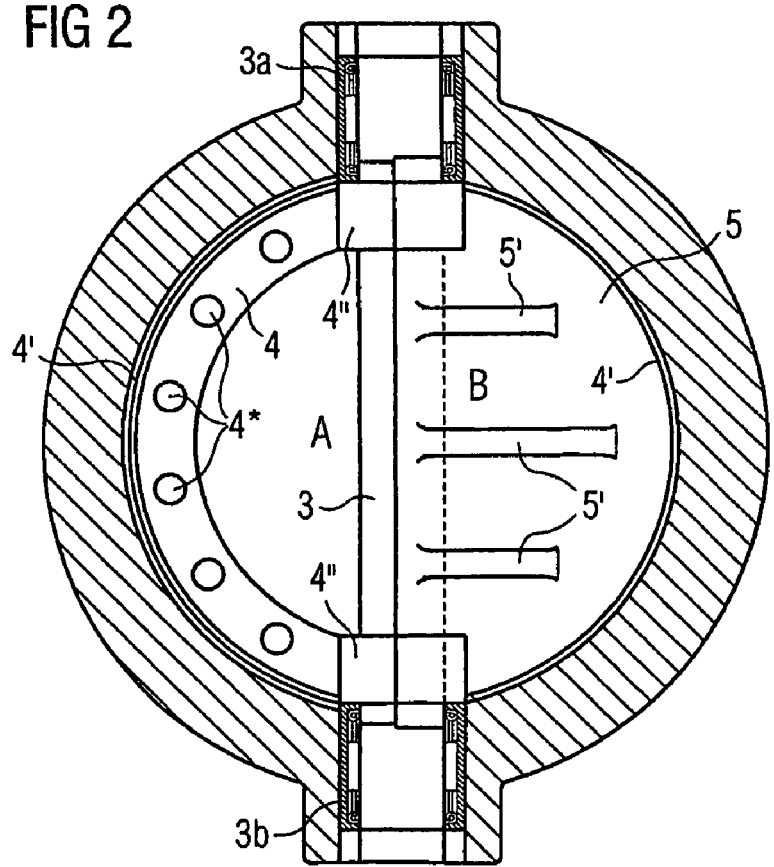
FIG. 2 shows the throttle valve assembly in cross section according to the section A-A in FIG. 1.

FIG. 2 illustrates the throttle valve assembly 2 in cross section according to the section A-A in FIG. 1. The throttle valve shaft 3 is mounted in two bearings 3a, 3b. The elastic compensation element 4 has two opposite perforations 4" which surround the throttle valve shaft 3. They may in this case also project into the bearing bores of the bearings 3a, 3b, with the result that sealing off against air with respect to the shaft perforation can advantageously be achieved. The elastic compensation element 4 has bores 4* which are arranged next to one another on the part circle. In these, too, the melted-down plastic introduced can be cured, thus leading to an increase in stability of the throttle valve. By means of the groove-shaped indentations produced in the formed cavity (not illustrated) on its side facing away from the throttle valve shaft, projections 5' are produced during curing which likewise contribute to increasing the stability.

Figure 3:
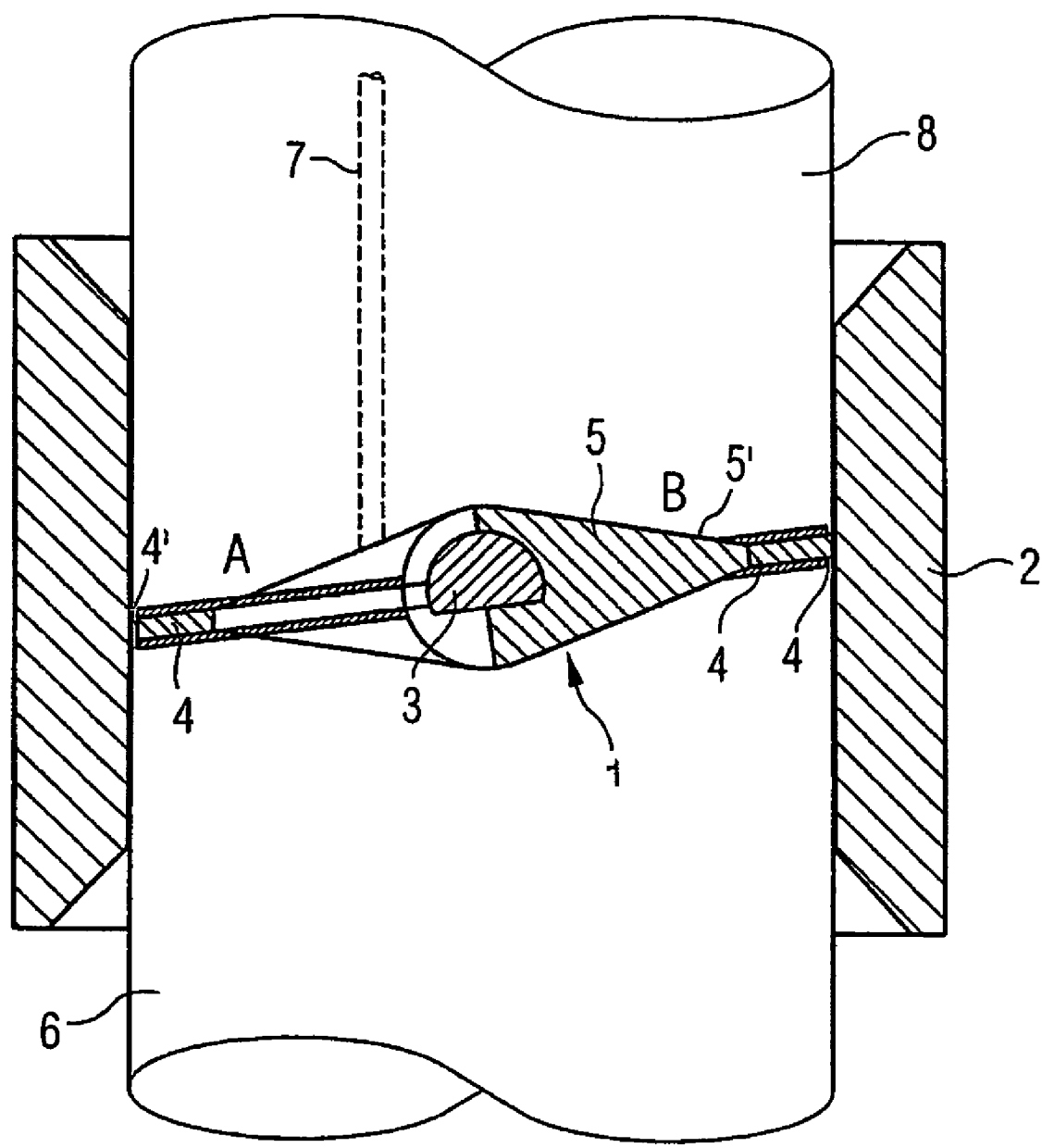
FIG. 3 shows a simplified illustration of the throttle valve assembly in cross section with the first die and with the second die.

FIG. 3 illustrates the throttle valve assembly 2 in cross section, together with the first die 6 and with the second die 8, diagrammatically and in simplified form. The second die 8 is provided with a supply duct 7, through which the melted-down plastic is introduced. The half illustration A in this case shows the conclusion of the second step. Subsequently, in a third step, the melted-down plastic is introduced through the second die 8, the at least one elastic compensation element 4 being pressed with its projection 4' against the inner wall of the throttle valve assembly 2. The half illustration B thus shows the conclusion of the third step of the method.

The invention claimed is:

1. A method for closing off a throttle valve assembly, comprising the steps of:
   fixing at least-one elastic compensation element, which is of part-circular design and has a projection on its outside, around a throttle valve shaft,
   introducing a first die and a second die into the throttle valve assembly from both sides, until they bear in each case against the projection and between the two of them and the respective projection form a cavity surrounding the throttle valve shaft,
   additionally introducing a melted-down plastic into the cavity through the first die or the second die, the at least one elastic compensation element being pressed with its projection against the inner wall of the throttle valve assembly, and
   removing the first die and the second die from the throttle valve assembly after curing of the plastic.

2. The method according to claim 1, wherein the step of fixing is performed substantially simultaneously with the step of introducing.

3. The method according to claim 1, wherein the at least one elastic compensation element comprises bores and is arranged next to another elastic compensation element on the part circle.

4. The method according to claim 1, wherein the at least one elastic compensation element or the melted-down plastic comprises polyamide-6.

5. The method according to claim 1, wherein the melted-down plastic is a polyphenylenesuffide.

6. The method according to claim 1, wherein the cavity includes groove-shaped indentations on its side facing away from the throttle valve shaft.

7. The method according to claim 1:
   wherein the elastic compensation element is one part and comprises two opposite perforations, and
   the step of fixing further comprises the step of pushing the elastic compensation element with the two opposite perforations onto the throttle valve shaft.

8. The method according to claim 2, wherein the at least one elastic compensation element comprises bores and is arranged next to another elastic compensation element on the part circle.

9. The method according to claim 2, wherein the at least one elastic compensation element or the melted-down plastic comprises polyamide-6.

10. The method according to claim 3, wherein the at least one elastic compensation element or the melted-down plastic comprises polyamide-6.

11. The method according to claim 2, wherein the melted-down plastic is a polyphenylenesulfide.

12. The method according to claim 3, wherein the melted-down plastic is a polyphenylenesulfide.

* * * * *